United States Patent [19]
Trutna

[11] Patent Number: 5,695,548
[45] Date of Patent: Dec. 9, 1997

[54] METHOD AND APPARATUS FOR PRODUCING CO-CURRENT FLUID CONTACT

[76] Inventor: William R. Trutna, 6 Postwood, Austin, Tex. 78738-1503

[21] Appl. No.: 555,889

[22] Filed: Nov. 13, 1995

[51] Int. Cl.$^6$ ............................................. B01D 45/10
[52] U.S. Cl. ........................... 95/216; 55/257.1; 95/221; 261/110; 261/114.1
[58] Field of Search ........................ 261/114.1, 97, 261/110, 114.5; 95/216, 221, 267; 55/223, 257.1; 202/158

[56] References Cited

U.S. PATENT DOCUMENTS

| | | | |
|---|---|---|---|
| 668,866 | 2/1901 | Young et al. | 55/423 |
| 801,211 | 10/1905 | Butzow | 55/444 X |
| 981,058 | 1/1911 | Bühring | 55/444 |
| 1,655,998 | 1/1928 | Gilmore | 196/125 X |
| 1,764,190 | 6/1930 | Bell | 208/353 |
| 1,974,768 | 9/1934 | Daniels et al. | 261/112.1 |
| 2,197,189 | 4/1940 | Morgan | 55/444 |
| 2,646,266 | 7/1953 | Lockwood | 261/114.1 X |
| 3,079,134 | 2/1963 | Winn | 261/113 |
| 3,343,821 | 9/1967 | Winn et al. | 261/112.1 |
| 3,445,094 | 5/1969 | Shobe | 261/114.1 |
| 3,722,839 | 3/1973 | Erickson et al. | 261/111 |
| 3,803,997 | 4/1974 | Van Raden | 261/114.1 X |
| 4,361,469 | 11/1982 | Trutna | 202/158 X |
| 4,762,651 | 8/1988 | Parker et al. | 261/114.1 |
| 4,776,989 | 10/1988 | Harper et al. | 261/97 |
| 4,909,967 | 3/1990 | Binkley et al. | 261/97 |
| 5,051,214 | 9/1991 | Chen et al. | 261/97 |
| 5,501,079 | 3/1996 | Kreis et al. | 261/97 X |

FOREIGN PATENT DOCUMENTS

| | | | |
|---|---|---|---|
| 2904143 | 1/1991 | Germany. | |
| 4301712 | 7/1994 | Germany. | |
| 762906 | 9/1980 | U.S.S.R. | 261/114.1 |
| 448556 | 6/1936 | United Kingdom. | |

OTHER PUBLICATIONS

Fair, J.R., and Seibert, A.F. "Contacting Mechanisms on a Cocurrent Flow Tray" handout from presentation at meeting of American Institute of Chemical Engineers, San Francisco, California, Nov. 13–18, 1994, paper given and handout available on Nov. 16, 1994, 19 pages.

"Perry's Chemical Engineers' Handbook" Green, D.W., Editor, McGraw–Hill Book Company, New York, Sixth Edition, 1984, pp. 5–48 through 5–50, and 18–28 through 18–32.

Katzen, R. Diebold, V.B., Moon, G.D., Jr., Rogers, W.A., and LeMesurier, K.A. "A Self–Descaling Distillation Tower" Chemical Engineering Progress, vol. 64, No. 1, Jan., 1968, pp. 79–84.

Simpson, L.L. "Process Piping: Functional Design" Chemical Engineering, Deskbook Issue, Apr., 14, 1969, pp. 167–181.

(List continued on next page.)

Primary Examiner—Richard L. Chiesa
Attorney, Agent, or Firm—E. Richard Zamecki

[57] ABSTRACT

An improved packing system and method are disclosed wherein a packing section includes a liquid distributor and a separator placed above the distributor so that gas rising through the liquid distributor contacts liquid in the distributor, forming a gas-liquid combination which rises in co-current flow to the separator. Liquid is collected in the separator, from which gas rises.

53 Claims, 5 Drawing Sheets

OTHER PUBLICATIONS

Fadel, T.M. "Selecting Packed-Column Auxiliaries" Chemical Engineering, Jan. 23, 1984, pp. 71-76.

Chen, G.K. "Packed Column Internals" Chemical Engineering, Mar. 5, 1984, pp. 40-51.

Kunesh, J.G. "Practical Tips on Tower Packing" Chemical Engineering, Dec. 7, 1987, pp. 101-105.

Bonilla, J.A. "Don't Neglect Liquid Distributors" Chemical Engineering Progress, Mar., 1993, pp. 47-61.

Moore, F., and Rukovena, F. "Liquid and Gas Distribution in Commercial Packed Towers" handout of presentation at 36th Canadian Chemical Engineering Conference, Oct. 5-8, 1986, 26 pages including cover page.

Trutna, W.R., and Bravo, J.L. "A New Cocurrent Gas/Liquid Contacting Device for High Gas Rate Applications" handout from presentation at meeting of American Institute of Chemical Engineers, Philadelphia, Pennsylvania, Aug. 20-23, 1989, 27 pages.

Trutna, W.R., Martin, C.L., and Martinez, A.G. "Trutna Tray" handout from presentation at meeting of American Institute of Chemical Engineers, New Orleans, Louisiana, Mar., 29-Apr. 2, 1992, 25 pages.

Trutna, W.R., Seibert, A.F., and Garcia-Martinez, J.A. "Trutna Tray Performance Studies" handout from presentation at meeting of American Institute of Chemical Engineers, Houston, Texas, Mar. 28-Apr. 1, 1993, 23 pages.

Trutna, W.R. "A New High-Efficiency Gas/Liquid Contacting Device" handout at Eighth Symposium of Separation Science and Technology for Energy Applications, Gatlinburg, Tennessee, Oct. 1993 sponsored by the U.S. Dept. of Energy, 1 page.

"Glitsch Grid® for Corrosive, Fouling and Other Difficult Service" Bulletin 207 promotional/technical material of Glitsch, Inc., 1985, 6 pages.

METHOD AND APPARATUS FOR PRODUCING CO-CURRENT FLUID CONTACT

ORIGIN OF THE INVENTION

This invention was made with Government support under Grant DE-FC02-901D13020 awarded by the U.S. Department of Energy. The Government has certain rights in this invention.

BACKGROUND OF THE INVENTION

1. Field of the Invention

The present invention pertains to techniques for enhancing contact between to fluids in a process chamber, such as a process tower. More particularly, the present invention relates to packing devices in exchange process chambers, such as are utilized in mass transfer or heat exchange processes, wherein the fluids are introduced to move generally in countercurrent or in crosscurrent in the process chamber, for example. The present invention establishes co-current contact flow between the fluids, generally in stages within the process chamber.

2. Description of Prior Art

Many commercial and chemical processes involve mass transfer or heat exchange, and utilize packed columns or chambers to carry out the steps. Such processes can include distillation, absorption and desorption, fractionating, gas cleaning and drying, scrubbing and various biological processes, for example. Two fluids, usually a gas and a liquid, are intermingled within a chamber, typically as countercurrent flow streams wherein the two fluids move generally in opposite senses along the same flow axis. In a co-current system, the two fluids move generally in the same sense along a single flow axis; a crosscurrent facility features the two fluids moving along separate, intersecting flow axes.

The mass transfer rates and/or the reaction rates of the processes increase with increasing opportunities for the two fluids to interface with each other. Packing is generally included in exchange process columns to enhance the interaction between two fluids in the column, thereby increasing the efficiency of the process. There are different types of packing systems, depending on the packing elements and their arrangements in the transfer chamber. Structured packing systems generally include extended, structured packing elements that are arranged within the chamber. Random packing systems comprise generally small, individual packing elements which may be dumped into the exchange chamber in a random array.

My U.S. Pat. No. 4,361,469, issued Nov. 30, 1982, is directed to tray-type packing systems in which a gas and liquid are made to contact in co-current flow, regardless of the direction of flow in which the gas and liquid are introduced into the process chamber. Multiple packing sections, including layered plates to receive liquid and a gas-liquid separator to remove liquid from a gas-liquid combination in each section, are disclosed in the '469 patent stacked in one or more columns. The present invention provides improvements to the technique disclosed in the '469 patent.

As used herein the term "gas-liquid combination" refers to any combination resulting from the mutual contact, or interfacing, of gas and liquid within a packing section according to the present invention, and may include newly-formed compounds or even just liquid droplets entrained in the gas flow, and is not intended to be limited to any particular type of mixing of gas and liquid, or any specific product resulting therefrom.

SUMMARY OF THE INVENTION

The present invention provides method and apparatus for use in a process chamber wherein a gas is made to flow upwardly through the chamber and a liquid is introduced into the chamber toward the top thereof to flow generally toward the bottom of the chamber, and wherein the gas and the liquid may interact. Packing sections, or stages, are provided wherein each packing section includes a liquid distributor having multiple, mutually-spaced conduits along which liquid may flow generally horizontally across the chamber and between which gas may flow, and a gas-liquid separator, positioned generally above the distributor, including multiple, mutually-spaced channels between which a gas-liquid combination may rise from the distributor below, whereby gas and liquid of the combination may separate and the liquid may be collected in the channels. A flow passage extends from the channels of the separator to a position below the distributor whereby liquid collected in the channels may be transported. The channels of the separator are arrayed in multiple, generally vertically-spaced layers with each layer comprising a plurality of mutually-spaced channels. Each of the distributor conduits is covered and features multiple ports whereby liquid in the conduit may emerge from the conduit to combine with gas flowing externally to the conduit.

The separator channels are oriented slanted downwardly toward the flow passage so that liquid collected in the channels is transported out through the flow passage. The depth of all of the channels in a layer of channels is the same, and is greater than the depth of the channels in each higher layer of channels. Further, the width of each channel in the separator is preferably no greater than 1.5 centimeters, and the lateral spacing between adjacent channels in the separator is preferably no greater than 1.5 centimeters.

Dispersion ladders may be included within the conduits, including in each dispersion ladder multiple flow regulators distributed along the length of the respective conduit. Deflector baffles may be provided above the conduits, and deflector baffles may be provided above the top layer of channels.

A wall is provided at the entrance to each conduit to cooperate with liquid in the conduit to provide a gas seal at the conduit entrance. A wall is also provided at the exit of each channel to cooperate with liquid in the channel to provide a gas seal at the channel exit.

Multiple packing sections may be stacked, for example, with flow passages transporting liquid to distributors in packing sections below the packing sections in which the liquid was collected.

In a method of the invention, liquid is transported to conduits of a distributor through which gas rises, liquid emerges from the distributor conduits to form a gas-liquid combination which rises to the channels of a separator, wherein liquid is collected as gas rises out of the separator. The collected liquid may be transported to another distributor and exposed to rising gas, and the process of co-current gas and liquid flow to a separator repeated.

The present invention provides a packing system of increased efficiency and capacity, and which may be constructed in modular form.

DESCRIPTION OF PREFERRED EMBODIMENTS

Figures 1, 10:
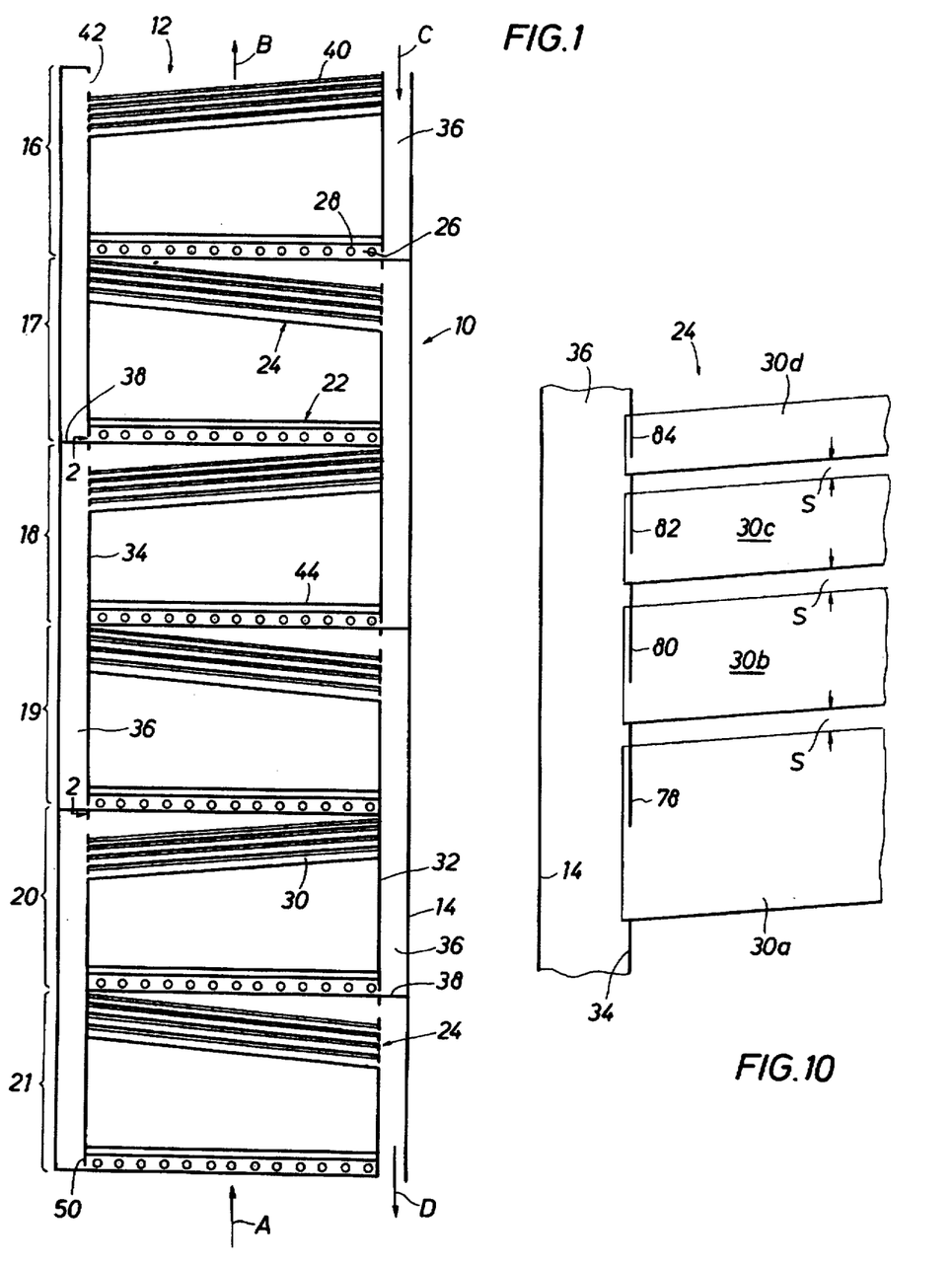
FIG. 1 is a schematic side elevation in partial section of a portion of a process chamber utilizing a six-stage, tray-type packing system according to the present invention.
FIG. 10 is an enlarged fragmentary schematic side elevation in partial section of a portion of a separator according to the present invention, showing the ends of multiple channels connected to a downcomer.

A process chamber, or tower, is shown generally at 10 in FIG. 1, including a tray-type packing system according to the present invention, indicated generally at 12. An outer wall 14 confines the packing system 12, and may be provided by the packing system itself, or may be the actual wall of the process chamber into which the packing system is fitted. In either case, the wall 14 partially defines flow passages as part of the packing system 12, as discussed below.

As illustrated, the process chamber 10 is used in processes wherein a gas and a liquid may interact when placed in mutual contact as a result of countercurrent flow of the two fluids through the chamber. Gas is introduced into the bottom of the chamber 10 as indicated by arrow A, and passes upwardly in the tower. Gas emerges from the top of the chamber 10, as indicated by the arrow B. Liquid is introduced into the top of the chamber 10 as indicated by the arrow C, and generally moves downwardly through the chamber, opposite to the upward movement of the gas. Liquid emerges from the bottom of the chamber as indicated by the arrow D. Within the chamber 10, gas and liquid are brought into mutual contact and interact according to the process dictated by the natures of the gas and the liquid, and the conditions within the chamber. Consequently, the gas emerging at arrow B may be expected to be changed compared to the gas entering the chamber 10 at arrow A, and the liquid emerging at arrow D may be expected to be different from the liquid entering the chamber at arrow C.

Although the gas and the liquid generally pass through the chamber 10 in opposite flow directions, that is, in counter-current flow, the packing system 12 causes the gas and the liquid to mutually contact within the chamber in co-current flow. The co-current flow of the gas and the liquid is achieved in stages that make up the packing system 12. Although a packing system according to the present invention may comprise any number of stages, including just one stage, the packing system 12 is shown to include six stages, 16, 17, 18, 19, 20 and 21, arranged in a single column so that all of the gas flow and all of the liquid flow passes through all of the stages. The stages 16–21 are identical except that the even numbered stages face toward one side and the odd numbered stages face toward the opposite side as illustrated. Further, the stages 16–21 are stacked so that, from top to bottom, for example, the orientations of the stages alternate. An end view of stages 18 and 19 is presented in FIG. 2, although the view of FIG. 2 would be the same for any even numbered stage above an odd numbered stage, for example.

Each stage 16–21 includes a liquid distributor 22 and a gas-liquid separator 24, positioned above the distributor. The distributor 22 spreads liquid laterally across the packing stage. Gas flows upwardly through the distributor 22, which allows liquid to contact the gas and be picked up in the flow of the gas. The gas-liquid combination flows into the separator 24 wherein liquid is captured and collected while gas continues to flow upwardly out of the separator. The gas and liquid thus interact in generally upward co-current flow within the packing stage between the time the gas moves through the distributor and first contacts the liquid there, and the time the liquid is collected in the separator and the gas leaves the separator.

Each distributor 22 includes multiple conduits 26 arranged in parallel, and mutually spaced apart, laterally across the packing stage. Liquid is received through an open end of each conduit 26 and extends along the conduit, generally toward the opposite, closed end thereof. The distributor conduits 26 of all of the even membered packing sections 16, 18 and 20 are open to the right as viewed in FIG. 1, and the conduits of the odd numbered sections 17, 19 and 21 are open to the left. The conduits 26 are covered, and ports, or weirs, 28 are provided along each conduit for egress of the liquid.

Each separator 24 includes multiple channels 30 arrayed in vertically-spaced layers, with each layer including a plurality of laterally-spaced channels. The channels 30 are U-shaped in cross section, so that they are open on top to receive liquid. As shown in FIG. 1, the channels 30 are sloped across the respective packing section so that liquid collected in the channels will flow toward the lower, open end of the channel in each case. The higher end of each channel is closed. Thus, separator channels 30 of all of the even numbered packing sections 16, 18 and 20 are open to the left as viewed in FIG. 1, and the channels of the odd numbered sections 17, 19 and 21 are open to the right.

Figure 2:
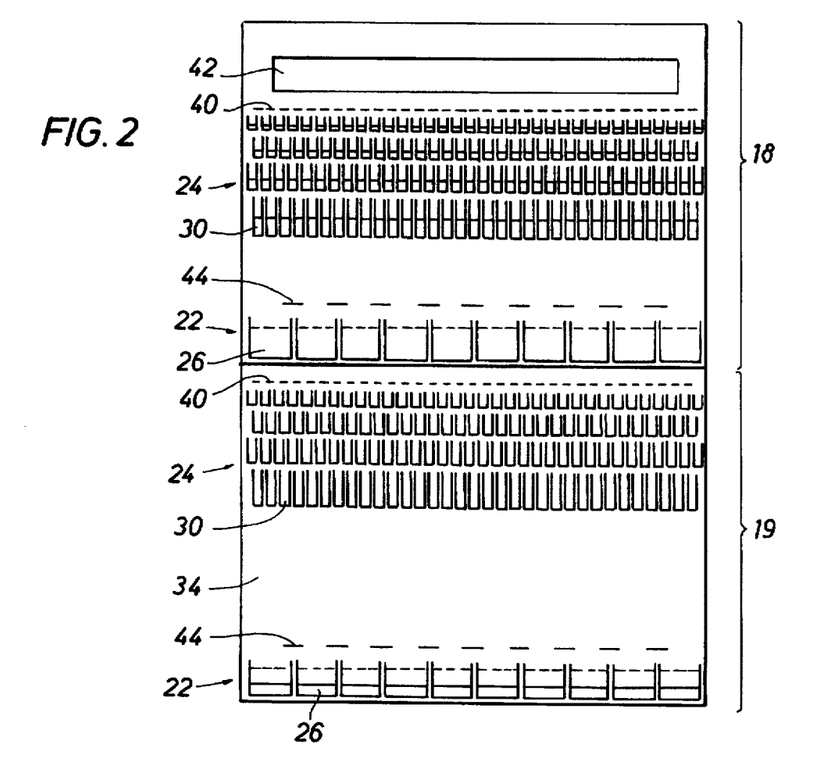
FIG. 2 is an enlarged schematic fragmentary sectional end view of the chamber and packing system of FIG. 1, taken along line 2—2 in FIG. 1.

The conduits 26 and the channels 30 are connected at their ends to inner walls 32 and 34, which include appropriate holes to receive the ends of the conduits and channels. FIG. 2 shows a portion of a wall 34 included in the two stages 18 and 19, for example. Comparison between FIGS. 1 and 2 reveals that the ends of the channels 30 received by the wall 34 in section 18 are the lower, open ends of these channels, and the ends of the channels received by the same wall in section 19 are the higher, closed ends of those channels. Similarly, the ends of the distributor conduits 26 received by the wall 34 in the packing section 18 are closed, while the ends of the conduits received by the same wall in the section 19 are open.

A flow passage is provided for transporting liquid to the open end of each conduit 26. The flow passages for all of the packing sections in FIG. 1 are provided by cooperation of the outer wall 14 and the inner wall 32 on the right of the chamber 10 as viewed in FIG. 1, and by cooperation of the outer wall 14 and the inner wall 34 on the left of the chamber. The flow passages, or downcomers, 36 thus formed also serve to transport liquid collected in the separators 24. Additionally, the flow passage 36 leading to the open ends of the conduits 26 in the distributor of the highest packing stage 16 receives the liquid introduced into the packing system 12 at arrow C; the flow passage leading from the separator 24 of the lowest packing stage 21 communicates the liquid out of the packing system 12 at arrow D.

Seals 38 are provided across the flow passages 36 at selected locations to direct the transport of liquid. In particular, seals 38 are placed across the flow passages 36 just below the open right ends of the distributor conduits 26 in the even numbered packing sections 16, 18 and 20, and just below the open left ends of the distributor conduits in the odd numbered packing sections 17, 19 and 21. The flow passages 36 and the seals 38 are thus arranged to direct liquid collected in any separator 24 to a position below the distributor 22 immediately below the separator wherein the liquid was collected, that is, to a position below the packing section containing the separator wherein the liquid was collected. In all cases except the case of the separator 24 of the lowest packing section 21, the liquid collected in a separator is transported to the open ends of the conduits 26 of the distributor 22 in the packing section immediately below the packing section of the separator wherein the liquid was collected. Liquid collected in the separator 24 of the lowest packing section 21 is transported out of the packing system 12 at D. Also, liquid introduced into the packing system 12 at C is transported along a flow passage 36 to the open ends of the conduits 26 of the distributor 22 of the highest packing section 16.

As may be appreciated by reference to FIG. 2, the channels 30 are arranged in each separator 24 in four layers, with the channels in each layer staggered laterally relative to the channels in the adjacent layer, or layers, so that the bottoms of the channels in a given layer are centered above the openings between adjacent channels in the layer immediately below, and there is no straight upward path through the separator. Further, as shown in FIGS. 1 and 2, an array of deflection baffles 40 is positioned above the top layer of channels 30 in each separator 24. The baffles 40 are elongate strips that parallel the slope of the channels 30 and are mounted by connection to the two inner walls 32 and 34. Each strip baffle 40 is positioned centered over the opening between two adjacent channels 30 in the top layer of channels to deflect any gas-liquid combination that reaches the level of the baffle and facilitate the separation of liquid from the gas-liquid combination at the top layer of channels The increase in pressure over the channels 30 due to the presence of the baffles 40 enhances liquid flow from the channels into the flow passage.

A vent 42 is provided in the wall 32 or 34 above the deflection baffles 40 at the open ends of the channels 30 of each separator 24. The vents 42 relieve any pressure buildup in the flow passages 36 to insure that the pressure in the flow passages is lower than the pressure in the separators 24.

As shown in FIGS. 1 and 2, an array of deflection baffles 44 is positioned above the array of conduits 26 in each distributor 22. The baffles 44 are elongate strips that parallel the conduits 26 and are mounted by connection to the two inner walls 32 and 34. Each strip baffle 44 is positioned centered over the opening between two adjacent conduits 26 in the respective distributor to deflect and produce turbulence in the gas and liquid combining at the distributor to enhance that combining process. It is preferred that the width of the deflector baffles 44 is approximately one-third greater than the lateral spacing between adjacent conduits 26. Multiple layers of parallel deflector baffles 44 (not shown) may be positioned over each distributor 22, with the layers staggered so that a baffle is centered over a spacing between adjacent baffles in the next lower layer.

Figure 3:
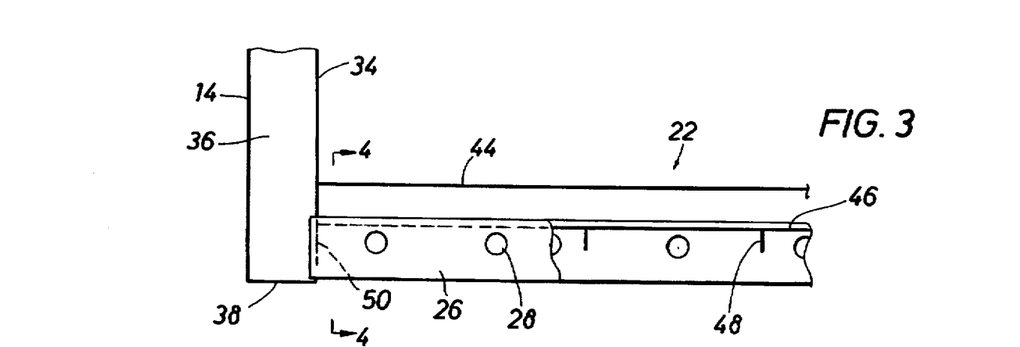
FIG. 3 is an enlarged schematic side elevation in partial section of a portion of a conduit in a liquid distributor of the type included in the packing system of FIGS. 1 and 2, illustrating one form of dispersion ladder and a deflection baffle, and showing the end of the conduit connected to a downcomer.
Figure 4:
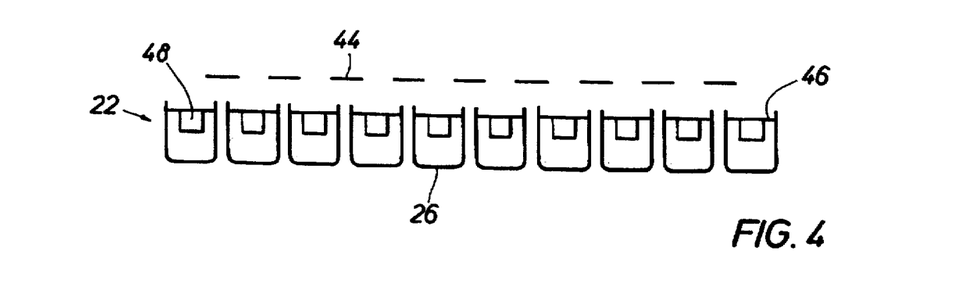
FIG. 4 is a sectional end view of multiple conduits in the distributor as shown in FIG. 3, taken along line 4—4 in FIG. 3.

Further details of the type of distributor 22 included in the packing system 12 in FIGS. 1 and 2 may be appreciated by reference to FIGS. 3 and 4. Each conduit 26 is an elongate tube of generally rectangular cross section, having a recessed cover to form a shallow trough 46 on the top of the conduit. A dispersion ladder is provided within the conduit 26 by an array of flow regulators in the form of plates 48, extending downwardly from the inside of the cover of the conduit at spaced positions along the length of the conduit. A skirt, or partition, 50 extends downwardly from the top of the open end of the conduit 26 where the conduit is connected to the inner wall 34.

In operation, liquid is transported down the flow passage 36 to the open end of each conduit 26, and flows into the conduit under the skirt 50, which cooperates with the liquid to form a seal against gas of any kind flowing through the opening between the interior of the conduit and the flow passage. The dispersion plates 48 tend to slow the movement of liquid within the conduit 26 to enhance the even distribution of liquid along the length of the conduit, and exposure to the ports 28. As gas rises between the conduits 26 in a distributor 22, liquid flows out of the conduits through the ports 28 to mix and interact with the gas. The narrow spacing between the conduits 26 causes the gas flowing therethrough to accelerate, thus insuring that the liquid is carried upwardly by the gas flow. The deflection baffles 44 tend to produce turbulence in the gas and gas-liquid combination flowing upwardly away from the conduits 26 to enhance the contact between liquid and the gas. A portion of the liquid collects in the recesses 46 for further liquid distribution and exposure to gas moving upwardly through the array of conduits 26. The result is an enhanced mixing and contacting of gas and liquid as the gas-liquid combination proceeds upwardly from the distributor 22.

Figure 5:
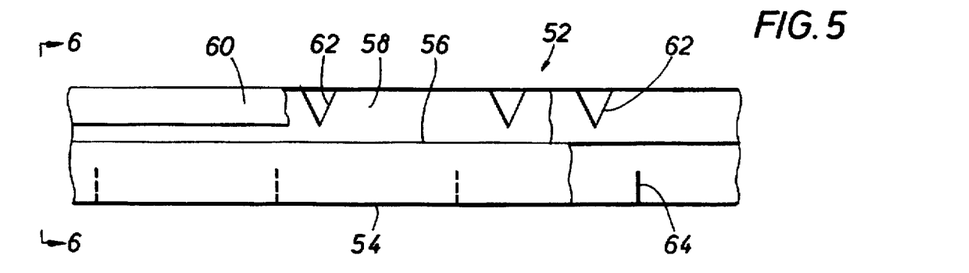
FIG. 5 is a schematic side elevation in partial section a portion of a conduit in a liquid distributor of another form according to the present invention, illustrating the use of wedge-shaped weirs and covering side walls, and another form of dispersion ladder.
Figure 6:
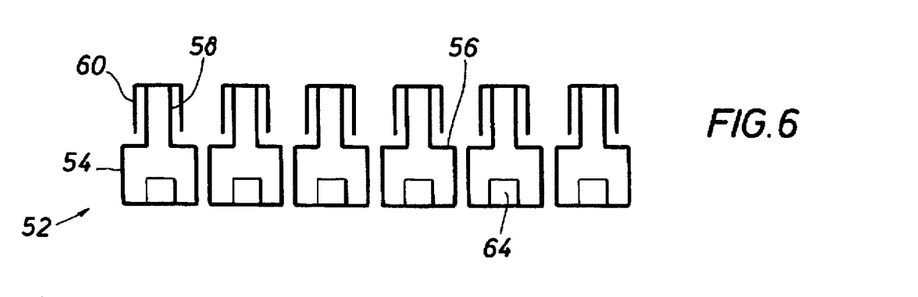
FIG. 6 is a sectional end view of multiple conduits in the distributor as shown in FIG. 5, taken along line 6—6 in FIG. 5.

Another type of distributor according to the present invention, and which may be used in the packing system 12 in place of the distributors 22 detailed in FIGS. 3 and 4, is shown generally at 52 in FIGS. 5 and 6. The distributor 52 includes multiple conduits 54 that feature one end open to receive liquid and the opposite end closed, with the conduits mounted between inner walls 32 and 34 of a packing section, just as in the case of the conduits 26 of FIGS. 1 and 2. Each conduit 54 is an elongate tube with a cross section featuring a reduction in width in the upper portion of the conduit to form two external shoulders 56 extending the length of the conduit. A vertical side wall 58 extends above each shoulder 56, and an external wall 60 is positioned above each shoulder, displaced away from and facing the corresponding wall 58. Ports or weirs, 62 included in each conduit 54 are located in the walls 58, above the shoulders 56 and opposite the external walls 60 which thus face the ports. The ports 62 are wedge-shaped so that liquid tends to emerge from the conduit 54 at faster rates, for a given set of pressure conditions, when there is a larger mount of liquid in the conduit. A dispersion ladder is provided within each conduit 54 by an array of flow regulators in the form of plates 64, extending upwardly from the inside of the bottom of the conduit at spaced positions along the length of the conduit. A skirt, or partition, (not shown) extends downwardly from the top of the open end of each conduit 54 where the conduit is connected to the inner wall of the packing system.

In operation, liquid is transported to and flows into the conduits 54, with the dispersion plates 64 enhancing the even distribution of liquid along the length of each conduit, as in the case of the operation of the conduits 26 in FIGS. 2 and 3, for example. As gas rises through the spaces between the conduits 54 in a distributor 52, liquid emerges from the conduits through the ports 62 to mix and interact with the gas. Liquid that does not immediately mix with gas and move off with the gas collects on the shoulders 56, being deflected back toward the walls 58 by the external walls 60. The liquid thus collected on the shoulders 56 is continuously exposed to gas flowing upwardly between the conduits 54 for contact and interaction with the gas.

Figure 7:
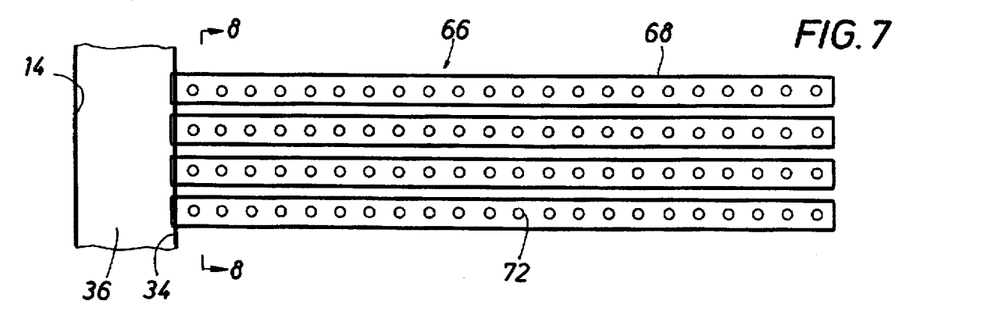
FIG. 7 is a schematic top plan view of a portion of a liquid distributor including conduits of yet another form according to the present invention, shown below the level of deflection baffles.
Figures 8, 9:
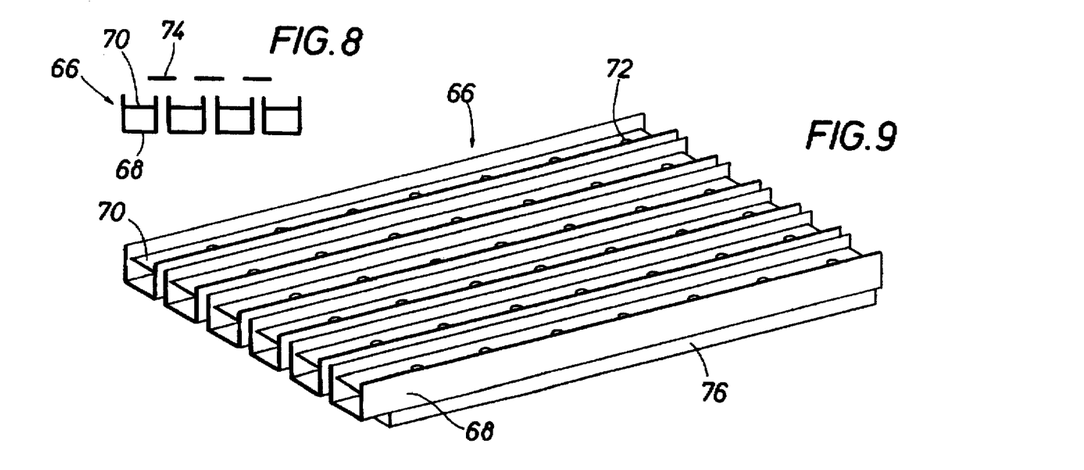
FIG. 8 is a sectional end view of the conduits in the distributor as shown in FIG. 7, taken along line 8—8 in FIG. 7 and including deflection baffles.
FIG. 9 is a perspective view of an array of distributor conduits of the type shown in FIGS. 7 and 8, constructed as part of a module for providing a packing system according to the present invention.

Yet another form of liquid distributor for use in a packing system according to the present invention is shown generally at 66 in FIGS. 7–9. The distributor 66 includes multiple conduits 68 that feature one end open to receive liquid and the opposite end closed, with the conduits mounted between inner walls 32 and 34 of a packing section, just as in the case of the conduits 26 of FIGS. 1 and 7. Each conduit 68 is an elongate tube with a generally rectangular cross section, having a recessed cover to form a shallow trough 70 on the top of the conduit. Ports, or weirs, 72 included in each conduit 68 are located in the cover of the conduit, within the recess 70. A dispersion ladder (not shown) may be provided within each conduit 68 in the form of downwardly extending plates 48, as in FIGS. 3 and 4, or upwardly extending plates 64, as in FIGS. 5 and 6, to enhance the even distribution of liquid along the conduits as discussed above. A skirt, or partition, (not shown) extends downwardly from the top of the open end of each conduit 68 where the conduit is connected to the inner wall of the packing system.

As shown in FIG. 8, an array of deflection baffles 74 is positioned above the array of conduits 68 in the distributor 66. The baffles 74 are elongate strips that parallel the conduits 68 and are mounted by connection to the two inner walls 32 and 34 of the packing system as shown in FIGS. 1 and 2, for example. Each strip baffle 44 is positioned centered over the opening between two adjacent conduits 68 to deflect and produce turbulence in the gas and liquid combining at the distributor to enhance that combining process, as discussed above in relation to the baffles 44 in FIGS. 1–4.

In operation, liquid is transported to and flows into the conduits 68, with dispersion plates (not shown) enhancing the even distribution of liquid along the length of each conduit, as in the case of the operation of the conduits 26 and 54 discussed above. As gas rises through the spaces between the conduits 68 in a distributor 66, liquid emerges from the conduits through the ports 72 to mix and interact with the gas. Liquid that does not immediately mix with gas is collected in the recesses 70 where the liquid is continuously exposed to gas flowing upwardly between the conduits 68 for contact and interaction with the gas. The deflection baffles 74 tend to produce turbulence in the gas and gas-liquid combination flowing upwardly away from the conduits 68 to enhance the contact between the liquid and the gas. The result is an enhanced mixing and contacting of gas and liquid as the gas-liquid proceeds upwardly from the distributor 66.

As shown in FIG. 9, the array of conduits 68 used to form a distributor 66 may be provided in modular form for ease of construction, such as on a palette 76. In practice, any of the distributors discussed herein may be so constructed. The ends of the conduits 68 extend beyond the ends of the palette 76 so that the conduit ends may be received within appropriate holes in the inner walls 32 and 34 for ease of mounting of the conduits. The accompanying extension of the conduits ends into the packing system inner walls 32 and 34 is shown in FIGS. 1, 3 and 7, for example.

Any of the different types of distributor conduits discussed above may employ either of the different types of dispersion ladders discussed. However, it appears that dispersion plates located near the level of the ports in the conduits achieve better results. For example, a preferred dispersion plate location is illustrated in FIG. 3 where the ports 28 and the dispersion plates 48 are both located at a similar level near the top of the conduit 26. With a distributor of the type shown in FIG. 7 in which the ports 72 are in the cover of the conduit 68, the high dispersion plate 48 location of FIG. 3 would be selected. However, if the ports 28 of FIG. 3 were located near the bottom of the conduit 26, the low dispersion plate 64 location of FIGS. 5 and 6 would be preferred.

Figure 11:
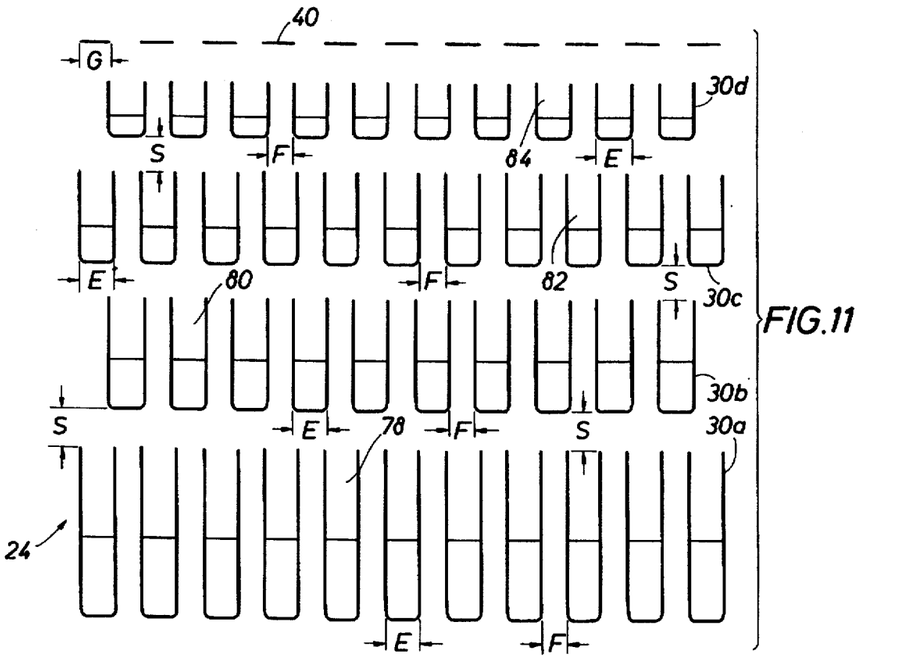
FIG. 11 is a schematic end view of an array of channels of a separator according to the present invention, indicating the use of skirts at the ends of the channels and baffles over the array.

Further details of a separator according to the present invention may be appreciated by reference to FIGS. 10 and 11. The separator 24 includes four layers of channels 30a, 30b, 30c and 30d, although any number of layers of channels may be used in such a separator. The channels 30a–30d are generally rectangular, with the width E of all the channels being the same. Also, the spacing F between adjacent channels is the same for all cases. However, while the depth of all of the channels in a given layer is the same, the depth of the channels in a given layer is greater than the depth of the channels in each higher layer in the separator 24. Additionally, the vertical spacing S between adjacent layers of channels may be the same for all layers. Finally, a skirt, or partition, extends downwardly from the top of the open end of each channel where the channel is connected to the inner wall such as 34 in a packing system to cooperate with the level of liquid in the channel in providing a seal to prevent gas flow into the flow passage 36. The channels also extend into the inner wall 32 or 34 for mounting in the packing system, as shown in FIG. 10. The deflector baffles 40 are a distance G wide, as indicated in FIG. 11.

A gas-liquid combination rises from a distributor (not shown) below the separator 24, and accelerates as it passes between the channels. At the same time the fluid combination also impinges on the bottoms of the channels 30a–30d as well as the deflector baffles 40 to swirl around the channels. With the fluid combination thus traversing the separator 24 liquid comes out of the combination and is collected in the open-top channels 30a–30d, with the gas continuing on upwardly. The collected liquid flows down the slopped channels 30a–30d toward the open ends thereof to be deposited in the flow passage 36. The lowest channel 30a collects the most liquid since it is exposed to the fluid combination first, before any liquid is removed. Each succeeding higher channel is exposed to a fluid combination with less liquid content than the lower channels, and therefore collects a lesser amount of liquid. Thus, the depths, and therefore the capacities, of the channels 30a–30d decrease going higher in the separator 24.

The length of the skirts at the open ends of the channels varies depending on the depth of the channels. As shown in FIG. 10, the lowest channel 30a is the deepest, with the longest extending skirt 78, the next higher channel 30b is less deep with a shorter skirt 80, then next higher channel 30c is even less deep with an even shorter skirt 82, and the highest channel 30d is the shallowest, with the shortest skirt 84. The spacing between the lower edge of each skirt 78–84 and the bottom of the respective channel 30a–30d also decreases, going from the lowest channel 30a to the highest channel 30d to accommodate the deeper body of liquid to be collected in the lower channels. The skirts 78–84 are indicated on one channel in each layer in FIG. 11.

The capability for a separator 24 to remove liquid from the gas-liquid combination passing upwardly through the separator is progressively enhanced with reduction of the channel width E while maintaining the spacing F at approximately 75% of E, and maintaining the vertical spacing S at approximately 117% of E. The dimension E should be no greater than 1.5 centimeters, and should be as low as 0.75 centimeters or less where very high separator performance is needed. Thus, for a separator whose channel width E is no greater than 1.5 centimeters, the channel spacing F is preferably no greater than 1.125 centimeters, and the layer spacing S is preferably no greater than 1.75 centimeters. The baffle width G is maintained at approximately the same value as E.

Figure 12:
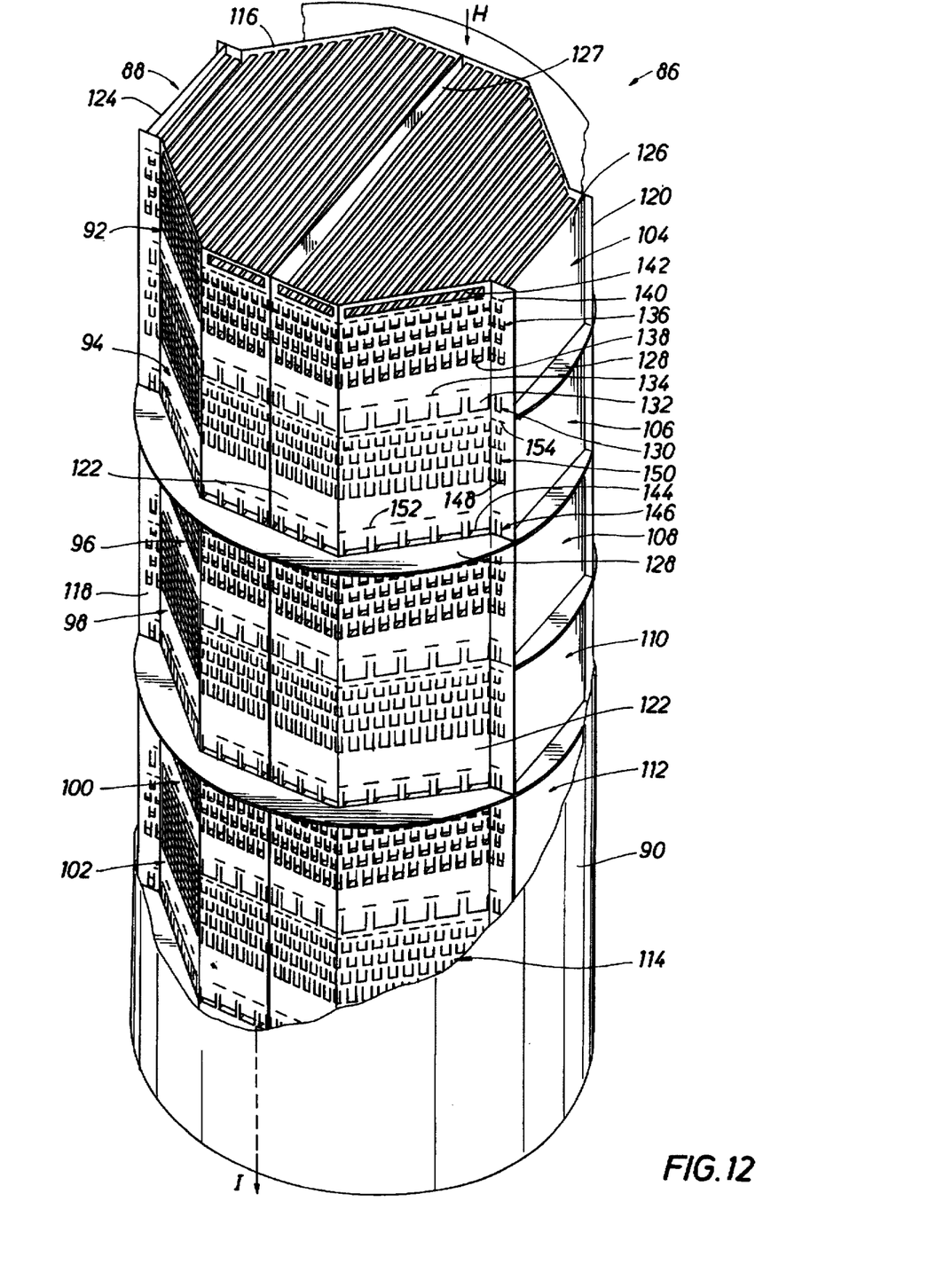
FIG. 12 is a reduced perspective view, partly schematic and in partial section, of a portion of a process chamber including a two-column, six-stage packing system according to the present invention, illustrating the modular construction by which the system may be made.

A process tower is shown generally at 86 in FIG. 12, including a packing system according to the present invention, shown generally at 88, that is constructed in modular form. The tower 86 encloses the packing system 88 in an outer, cylindrical wall 90. The packing system 88 includes twelve packing sections arranged in two columns, with sections shown generally at 92, 94, 96, 98, 100 and 102 stacked in one column, and sections shown generally at 104, 106, 108, 110, 112 and 114 stacked in a second column, with all sections shaped generally with beveled ends to fit within the cylindrical tower wall 90. Each packing section 92–102 in one column features inner walls 116 and 118 having extended side edges that seal with the outer wall 90. Each packing section 104–114 in the other column features inner walls 120 and 122 having extended side edges that seal with the outer wall 90 as well. Inner, side walls 124 and 126 extend between inner walls 116 and 118, and between inner walls 120 and 122, respectively. A vertical, interior wall 127 separates the two columns of sections 92–102 and 104–114. Seals in the form of shelf members 128 are provided to seal the inner walls 116–122 to the outer wall 90 just below the open ends of the conduits in liquid distributors of the packing sections 92–114. Thus, flow passages are formed between the outer wall 90 and the inner walls 116–122 to transport liquid collected in separators to locations below the distributors of the packing sections containing the respective separators wherein the liquid was collected.

For example, packing section 104 includes a liquid distributor shown generally at 130, including an array of conduits 132 and a layer of deflection baffles 134 above the conduits. The conduits 132 may be of any type described above. The closed ends of the conduits 132 are visible in FIG. 12. A separator 136 is located above the distributor 130 in the section 104, and includes four layers of channels 138 and a layer of deflection baffles 140 above the channels. A vent 142 is located above the baffles 140. The lower, open ends of the channels 138 are visible in FIG. 12. Liquid enters the tower 86 by way of the flow passage leading down to the first seal 128 and the open ends of the distributor conduits 132 in the section 104 (not visible) at the arrow H. Gas enters the bottom of the packing system 88. Gas rising through the distributor 130 in the section 104 interacts with the liquid emerging from that distributor, and the gas-liquid combination rises to the separator 136 of the same section. Liquid collected from the gas-liquid combination at the separator 136 of the section 104, while gas continues upwardly out of the packing system, flows out of the open ends of the channels of the separator between the outer wall 90 and the inner wall 122 to the seal 128, and into the open ends of conduits 144 of the distributor 146 of the next lower packing section 106.

Gas rising through the distributor 146 of the section 106 interacts with liquid emerging from the conduits 144 of that distributor, and the resulting gas-liquid combination rises to channels 148 in a separator 150 of the same section. Liquid collected in the channels 148 flows out of the open ends of those channels (toward the back in FIG. 12) into the flow passage formed between the outer wall 90 and the inner wall 120, down to a seal 128 where the liquid enters the open ends of distributor conduits in the next section 108. The distributor 146 and the separator 150 of section 106 also include arrays of deflector baffles 152 and 154, respectively, and a vent is located above the separator (not visible).

The process is repeated for both columns, and all sections, with the result that liquid, having interacted repeatedly with gas rising in the packing system 88, emerges at the bottom of the system at I, and gas, having interacted with liquid repeatedly, rises out of the packing system.

The packing sections 108 and 112 are identical to the packing section 104, and the packing sections 110 and 114 are identical to the section 106. Also, the packing sections 92, 96 and 100 are mirror images of the packing sections 104, 108 and 112, respectively while the sections 94, 98 and 102 are mirror images of the sections 106, 110 and 114, respectively.

Figure 13:
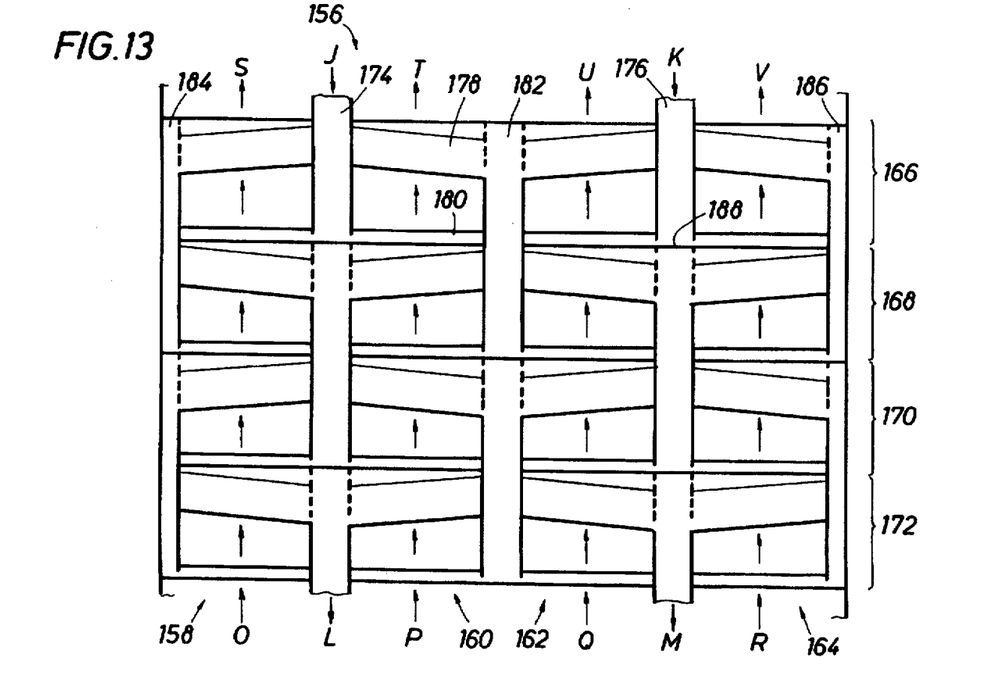
FIG. 13 is a schematic side elevation of a four-column, four-stage packing system according to the present invention.

Another packing system according to the present invention is shown generally at 156 in FIG. 13. The system 156 includes four columns 158, 160, 162 and 164 of packing sections, with each column containing four packing sections 166, 168 170 and 172 for a total of sixteen packing sections. Liquid enters the system 156 through the tops of two stacks of flow passages 174 and 176 at arrows J and K, respectively. Gas enters the system through the bottoms of the four columns 158, 160, 162 and 164 at arrows O, P, Q and R, respectively, and leaves through the tops of the columns at arrows S, T, U and V, respectively. Each packing section may be of any type described herein, and includes a separator 178 and a distributor 180. A central stack of flow passages 182 and two peripheral stacks of flow passages 184 and 186 are also provided. Flow passage seals 188 are positioned in the flow passages 174, 176, 182, 184 and 186 at positions just below the open ends of distributor conduits. The packing sections 166–172 operate as described above in relation to the apparatus shown in FIGS. 1–11, with liquid collected in the separator of one section being transported down to the distributor of the next lower section, for example. However, the liquid passing downwardly within the stacked central flow passage 182 will pass between columns 160 and 162, in going from a section 166 to a section 168, or from a section 170 to a section 172.

Similarly, liquid passing downwardly within the stacked flow passage 174 will pass between columns 158 and 160 in going from a section 168 to a section 170, and liquid passing downwardly within the stacked flow passage 176 will pass between columns 162 and 164 in going from a section 168 to a section 170.

The foregoing disclosure and description of the invention is illustrative and explanatory thereof, and various changes in the method steps as well as the details of the apparatus may be made within the scope of the appended claims without departing from the spirit of the invention.

What is claimed is:

1. Apparatus for use in a process chamber wherein a gas is made to flow upwardly through the chamber and a liquid is introduced into the chamber toward the top thereof to flow generally toward the bottom of the chamber, and wherein the gas and the liquid may interact, comprising:

a. a liquid distributor including multiple, mutually-spaced conduits along which liquid may flow generally horizontally across the chamber and between which gas may flow;

b. a gas-liquid separator, positioned generally above the distributor, including multiple, mutually-spaced channels between which a gas-liquid combination may rise from the distributor below, whereby gas and liquid of the combination may separate and the liquid may be collected in the channels; and c. at least one flow passage extending from the channels of the separator to a position below the distributor whereby liquid collected in the channels may be transported;

d. each of the conduits being covered and comprising multiple ports whereby liquid in the conduit may emerge from the conduit to combine with gas flowing externally to the conduit.

2. Apparatus as defined in claim 1 further comprising a dispersion ladder within each conduit, including in each dispersion ladder multiple flow regulators distributed along the length of the respective conduit.

3. Apparatus as defined in claim 2 wherein each flow regulator comprises an obstruction projecting downwardly from the cover of the conduit in which the flow regulator is located.

4. Apparatus as defined in claim 2 wherein each flow regulator comprises an obstruction projecting upwardly from the bottom of the conduit in which the flow regulator is located.

5. Apparatus as defined in claim 1 further comprising baffles with each baffle positioned above the space between two adjacent conduits.

6. Apparatus as defined in claim 1 wherein the ports of the conduits are located along the sides of the respective conduits.

7. Apparatus as defined in claim 6 wherein the ports are wedge-shaped with the apex of each wedge shape at the bottom of the respective port.

8. Apparatus as defined in claim 6 wherein each conduit further comprises at least one external, upwardly-facing shoulder above which are located at least some of the ports of the conduit, and an external wall displaced generally upwardly from each such shoulder and facing the ports thereabove.

9. Apparatus as defined in claim 6 further comprising an upwardly-facing shoulder extending generally along each side of each conduit, with ports on each side of the conduit located above the shoulder on the respective side, and an external wall extending generally along each side of the conduit, displaced above each shoulder and facing the ports thereabove.

10. Apparatus as defined in claim 9 wherein the shoulders of the conduits are formed by a reduction in widths of the conduits.

11. Apparatus as defined in claim 1 wherein the cover of each conduit is recessed.

12. Apparatus as defined in claim 11 wherein the ports of the conduits are located along the covers of the respective conduits.

13. Apparatus as defined in claim 1 further comprising a wall extending downwardly from the cover of each conduit at the entrance to the conduit whereby liquid in the conduit cooperates with the wall to form a gas seal at the entrance to the conduit.

14. Apparatus as defined in claim 1 wherein the separator channels are arrayed in multiple, generally vertically-spaced layers with each layer comprising a plurality of laterally-spaced channels.

15. Apparatus as defined in claim 14 wherein the depth of all of the channels in a layer is the same, and is greater than the depth of the channels in each higher layer in the separator.

16. Apparatus as defined in claim 14 wherein the width of each channel in the separator is no greater than 1.5 centimeters, the lateral spacing between adjacent channels in each layer is no greater than 1.125 centimeters, and the vertical spacing between adjacent layers of channels is no greater than 1.75 centimeters.

17. Apparatus as defined in claim 14 further comprising baffles with each baffle positioned above the space between two adjacent channels in the top layer of channels in the separator.

18. Apparatus as defined in claim 1 wherein the separator channels are oriented slanted downwardly toward the flow passage.

19. Apparatus as defined in claim 1 further comprising a wall extending downwardly from the top of each channel at the exit from the channel to the flow passage whereby liquid in the channel cooperates with the wall to form a gas seal at the exit from the channel.

20. Apparatus as defined in claim 1 further comprising a vent between the interior of the flow passage and the area above the separator.

21. Apparatus as defined in claim 1 further comprising multiple distributors, vertically spaced apart within the chamber, multiple separators, with a gas-liquid separator positioned generally above each distributor, and multiple flow passages, with at least one flow passage extending from the channels of each separator to a position below the distributor immediately below the respective separator, so that liquid collected in one separator may be transported to the distributor next below the distributor immediately below the separator at which the liquid is so collected, with the flow passage from the lowest separator extending below the lowest distributor for transport of liquid out of the chamber.

22. Apparatus as defined in claim 1 further comprising a module including at least two sections wherein each section includes a separator positioned above a distributor, a first flow passage extending downwardly from one end of the separator from which liquid collected in the channels of the separator may be transported, and a second flow passage extending upwardly from one end of the distributor at which liquid may be introduced into the distributor, and wherein one section is located above another section so that the first flow passage from the separator of the higher section continues as the second flow passage to the distributor of the lower section.

23. Apparatus as defined in claim 22 further comprising multiple such modules combined in a stack.

24. A method of operating a process between a gas and a liquid in a chamber, comprising the following steps:

a. providing multiple liquid distributors at generally vertically-spaced positions in the chamber, with each distributor including multiple, mutually-spaced conduits along which liquid may flow generally horizontally across the chamber and between which gas may flow;

b. providing multiple gas-liquid separators with a separator positioned generally above each distributor, with each separator including multiple, mutually-spaced channels, arrayed in multiple layers of channels, between which channels a gas-liquid combination may rise from the distributor below whereby gas and liquid of the combination may separate and the liquid may be collected in the channels of the respective separator;

c. providing multiple flow passages with at least one flow passage extending from the channels of each separator to a position below the distributor immediately below the respective separator whereby liquid collected in the channels may be transported, so that liquid collected in one separator is so transported to the distributor next below the distributor immediately below the separator at which the liquid is so collected, with the flow passage from the lowest separator transporting liquid below the lowest distributor for transport out of the chamber, and providing at least one flow passage to the highest distributor by which liquid may be introduced into the chamber;

d. further providing each of the conduits covered and comprising multiple ports whereby liquid in the respective conduit may emerge from the conduit and combined with gas flowing externally to the conduit; and e. introducing liquid into the chamber toward the top thereof and introducing gas into the chamber toward the bottom thereof so that gas rises generally upwardly in the chamber, passing between the conduits in the distributors and between the channels in the separators, and liquid is distributed generally across the chamber in the conduits of the distributors, the gas so passing between the conduits of each distributor combining with liquid passing out of the ports of the conduits of the respective distributor, such gas-liquid combination rising to the next separator above, and with liquid there separating from gas and being collected in the channels of the separator, and gas further rising above the separator.

25. A method as defined in claim 24 further providing dispersion ladders within the conduits of the distributors and thereby regulating the flow of liquid along the conduits.

26. A method as defined in claim 24 further providing baffles above the spaces between the conduits in the distributors and thereby deflecting the rise of gas and liquid from the respective distributors.

27. A method as defined in claim 24 further providing the conduits in the distributors with external shoulders below ports in the side of the respective conduits, and an external wall displaced above each shoulder, facing the ports thereabove, and thereby deflecting liquid from the ports to fall onto the shoulder.

28. A method as defined in claim 24 further providing the channels in the separators with widths no greater than 1.5 centimeters and with lateral spacing between adjacent channels no greater than 1.5 centimeters.

29. A method as defined in claim 24 further providing the separator channels oriented slanted downwardly toward the respective flow passages.

30. A method as defined in claim 24 further providing baffles above the spaces between the channels in the top layer of channels in each separator and thereby deflecting the rise of gas-liquid combination from the respective separators.

31. A method as defined in claim 24 further providing a vent between the area above each separator and the interior of the adjacent flow passage.

32. A method as defined in claim 24 further providing the ports of the conduits located along the sides of the respective conduits.

33. A method as defined in claim 24 further providing the conduits with recessed covers.

34. A method as defined in claim 33 further providing the ports of the conduits located along the covers of the respective conduits.

35. A method as defined in claim 24 further providing the channels in the separators with widths no greater than 1.5 centimeters, with lateral spacing between adjacent channels in each layer no greater than 1.125 centimeters, and with vertical spacing between adjacent layers of channels in a separator no greater than 1.75 centimeters.

36. A method as defined in claim 24 further providing a wall extending downwardly from the cover of each conduit at an entrance to the conduit whereby liquid in the conduit cooperates with the wall to form a gas seal at the entrance to the conduit.

37. A method as defined in claim 24 further providing a wall extending downwardly from the top of each channel at an exit from the channel whereby liquid in the channel cooperates with the wall to form a gas seal at the exit from the channel.

38. Apparatus for use in a process chamber wherein a gas is made to flow upwardly through the chamber and a liquid is introduced into the chamber toward the top thereof to flow generally toward the bottom of the chamber, and wherein the gas and the liquid may interact, comprising:

a. multiple liquid distributors positioned at generally vertically-spaced locations in the chamber, each distributor including multiple, mutually-spaced conduits along which liquid may flow generally horizontally across the chamber and between which gas may flow;

b. multiple gas-liquid separators with a separator positioned generally above each distributor, each separator including multiple, mutually-spaced channels between which a gas-liquid combination may rise from the distributor below whereby gas and liquid of the combination may separate and the liquid may be collected in the channels of the respective separator; and c. multiple flow passages with at least one flow passage extending from the channels of each separator to a position below the distributor immediately below the respective separator whereby liquid collected in the channels may be transported, so that liquid collected in one separator is so transported to the distributor next below the distributor immediately below the separator at which the liquid is so collected, with the flow passage from the lowest separator extending below the lowest distributor for transport of liquid out of the chamber, and at least one flow passage to the highest distributor by which liquid may be introduced into the chamber;

d. each of the conduits being covered and comprising multiple ports along the length thereof whereby liquid in the respective conduit may emerge from the conduit and combined with gas flowing externally to the conduit.

39. Apparatus as defined in claim 38 further comprising dispersion ladders within the conduits, including in each dispersion ladder multiple flow regulators distributed along the length of the respective conduit.

40. Apparatus as defined in claim 38 further comprising baffles positioned above the spaces between the conduits in the distributors.

41. Apparatus as defined in claim 38 further comprising external shoulders as parts of the conduits with each shoulder located below ports in the side of the respective conduit, and external walls as parts of the conduits, with each wall displaced above a respective shoulder and facing ports in the side thereabove.

42. Apparatus as defined in claim 38 wherein the channels of each separator are arrayed in multiple, generally vertically-spaced layers with each layer comprising a plurality of mutually-spaced channels.

43. Apparatus as defined in claim 42 wherein the depth of all of the channels in a layer of channels of a separator is the same, and is greater than the depth of the channels in each higher layer of channels of the respective separator.

44. Apparatus as defined in claim 38 wherein the width of each channel in the separators is no greater than 1.5 centimeters, and the lateral spacing between adjacent channels in the separators is no greater than 1.5 centimeters.

45. Apparatus as defined in claim 38 wherein the separator channels are oriented slanted downwardly toward the respective flow passages.

46. Apparatus as defined in claim 38 further comprising baffles positioned above the separators.

47. Apparatus as defined in claim 38 wherein the ports of the conduits are located along the sides of the respective conduits.

48. Apparatus as defined in claim 38 wherein the covers of the conduits are recessed.

49. Apparatus as defined in claim 48 wherein the ports of the conduits are located along the covers of the respective conduits.

50. Apparatus as defined in claim 38 further comprising a vent between the area above each separator and the interior of the flow passage extending from the channels of the respective separator.

51. Apparatus as defined in claim 38 wherein the channels in the separators have widths no greater than 1.5 centimeters, the lateral spacing between adjacent channels in each layer of channels is no greater than 1.125 centimeters, and the vertical spacing between layers of channels in each separator is no greater than 1.75 centimeters.

52. Apparatus as defined in claim 38 further comprising a wall extending downwardly from the cover of each conduit at an entrance to the conduit whereby liquid in the conduit cooperates with the wall to form a gas seal at the entrance to the conduit.

53. Apparatus as defined in claim 38 further comprising a wall extending downwardly from the top of each channel at an exit from the channel whereby liquid in the channel cooperates with the wall to form a gas seal at the exit from the channel.

* * * * *